U S009897897B2

(12) United States Patent
Kobayashi et al.

(10) Patent No.: US 9,897,897 B2
(45) Date of Patent: Feb. 20, 2018

(54) HEAT MANAGEMENT SYSTEM FOR USE IN AN IMAGE PICKUP APPARATUS

(71) Applicant: Olympus Corporation, Hachioji-shi, Tokyo (JP)

(72) Inventors: Yuji Kobayashi, Hachioji (JP); Masaya Ota, Yokohama (JP); Yukinori Takahashi, Hachioji (JP); Hiroki Amino, Hino (JP); Yoshihiro Yokomae, Higashiyamoto (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/191,770

(22) Filed: Jun. 24, 2016

(65) Prior Publication Data

US 2017/0059965 A1 Mar. 2, 2017

(30) Foreign Application Priority Data

Aug. 25, 2015 (JP) .................................. 2015-165866

(51) Int. Cl.
*H04N 5/225* (2006.01)
*H04N 5/232* (2006.01)
*G03B 17/55* (2006.01)
*G03B 17/02* (2006.01)

(52) U.S. Cl.
CPC ............. *G03B 17/55* (2013.01); *G03B 17/02* (2013.01); *H04N 5/2253* (2013.01); *H04N 5/2254* (2013.01); *H04N 5/23241* (2013.01)

(58) Field of Classification Search
CPC .... H04N 5/2253; H04N 5/2254; G03B 17/55; H01L 23/3675
See application file for complete search history.

(56) References Cited

U.S. PATENT DOCUMENTS

| 2005/0212954 | A1* | 9/2005 | Senba | H04N 5/23209 348/360 |
|---|---|---|---|---|
| 2009/0244363 | A1* | 10/2009 | Sugimura | H04N 5/2251 348/374 |
| 2014/0184835 | A1* | 7/2014 | Nozawa | H04N 5/2252 348/208.3 |
| 2014/0369039 | A1* | 12/2014 | Den Boer | F28F 21/06 362/235 |
| 2016/0174408 | A1* | 6/2016 | Tolbert | H05K 1/0209 348/373 |

FOREIGN PATENT DOCUMENTS

JP 5541431 5/2014

* cited by examiner

*Primary Examiner* — Christopher K Peterson
(74) *Attorney, Agent, or Firm* — John C. Pokotylo; Pokotylo Patent Services

(57) ABSTRACT

An image pickup apparatus, having a casing including an image pickup device, includes: a casing that surrounds a shooting light flux and has a length in a direction of the shooting light flux; an image pickup device that receives the shooting light flux at a terminal end of the shooting light flux in the casing and picks up an image; a planar electric substrate arranged in parallel to an optical axis of the shooting light flux, outside an image pickup surface of the image pickup device; an electronic element mounted on the electric substrate, the electronic element generating heat along with operation of an electronic circuit; a heat transmission sheet placed on the electronic element; and a heat sink placed on the heat transmission sheet so that the heat transmission sheet is held together with the electronic element between the electric substrate and the heat sink.

18 Claims, 9 Drawing Sheets

HEAT MANAGEMENT SYSTEM FOR USE IN AN IMAGE PICKUP APPARATUS

CROSS REFERENCE TO RELATED APPLICATION

This application claims the benefit of Japanese Application No. 2015-165866 filed in Japan on Aug. 25, 2015, the contents of which are incorporated herein by this reference.

BACKGROUND OF THE INVENTION

1. Field of the Invention

The present invention relates to an image pickup apparatus that incorporates a power supply battery and an image pickup device therein and has an image pickup function.

2. Description of the Related Art

In recent years, mobile electronic devices, for example, smartphones and tablet computers have widely been used. In concert with this, various proposals relating to devices used in combination of these types of mobile electronic devices have conventionally been made and various devices have been put into practical use.

Examples of the devices used in combination with the aforementioned conventional mobile electronic devices include, e.g., an image pickup apparatus having an image pickup function by means of incorporation of a high-performance image pickup device, such as one employed in, e.g., a general camera, and a power supply battery and allows detachment/attachment of a replaceable lens barrel.

Since this type of image pickup apparatus includes an image pickup device, the image pickup apparatus itself has an image pickup function. Therefore, some of the image pickup apparatuses are configured so as to, besides the capability of operating as an image pickup apparatus alone, be capable of, by means of communication with a mobile electronic device such as mentioned above, e.g., performing image pickup operation via remote control using the mobile electronic device, and displaying a live view image or a shot image using a display apparatus of the mobile electronic device, and also enabling, e.g. indication of a menu for various settings for the image pickup apparatus to be made from the mobile electronic device side.

Conventional image pickup apparatuses of this type generally include, inside a body of the apparatus, e.g., a power supply unit including a power supply battery (e.g., a rechargeable battery) that supplies power to internal component units in addition to an image pickup unit including an image pickup device that performs photoelectric conversion of an object image to generate image data.

For example, an image pickup apparatus disclosed in Japanese Patent No. 5541431 includes, in a rough center part of the inside of a body of the apparatus, an image pickup unit including an image pickup device, and is configured in such a manner that a battery holding chamber is formed in an internal space on a part close to a back side of the body and a power supply battery (rechargeable battery) having a shape corresponding to a shape of the battery holding chamber is detachably disposed. In this case, in the image pickup apparatus described in Japanese Patent No. 5541431, an electric substrate with an image pickup device mounted thereon is arranged in parallel to a surface orthogonal to an optical axis and a main substrate with an image processing engine (semiconductor that handles, e.g., output signals and video signals from the image pickup device) mounted thereon and a flat-shaped power supply battery are arranged in parallel to the electric substrate.

For such forms of conventional image pickup apparatuses as mentioned above, there has consistently been a demand for reduction in size of the apparatuses themselves. Therefore, various component units disposed inside the apparatus tend to be disposed extremely closely. In this case, various ingenuities are necessary for efficiently releasing (dissipating) heat generated from components that generate a large amount of heat during operation, for example, a power supply unit including a power supply battery (e.g., a rechargeable battery) and an image pickup unit including an image pickup device, and a main substrate with electronic parts such as integrated circuits providing an image processing engine and a control circuit, to the outside.

SUMMARY OF THE INVENTION

In order to achieve the above object, an image pickup apparatus according to an aspect of the present invention is an image pickup apparatus including a casing including an image pickup device, the image pickup apparatus including: a casing that surrounds a shooting light flux and has a length in a direction of the shooting light flux; an image pickup device that receives the shooting light flux at a terminal end of the shooting light flux in the casing and picks up an image; a planar electric substrate arranged in parallel to an optical axis of the shooting light flux, outside an image pickup surface of the image pickup device; an electronic element mounted on the electric substrate, the electronic element generating heat along with operation of an electronic circuit; a heat transmission sheet placed on the electronic element; and a heat sink placed on the heat transmission sheet so that the heat transmission sheet is held together with the electronic element between the electric substrate and the heat sink.

Benefits of the present invention will become further apparent from the detailed description below.

DETAILED DESCRIPTION OF THE PREFERRED EMBODIMENTS

Figure 1:
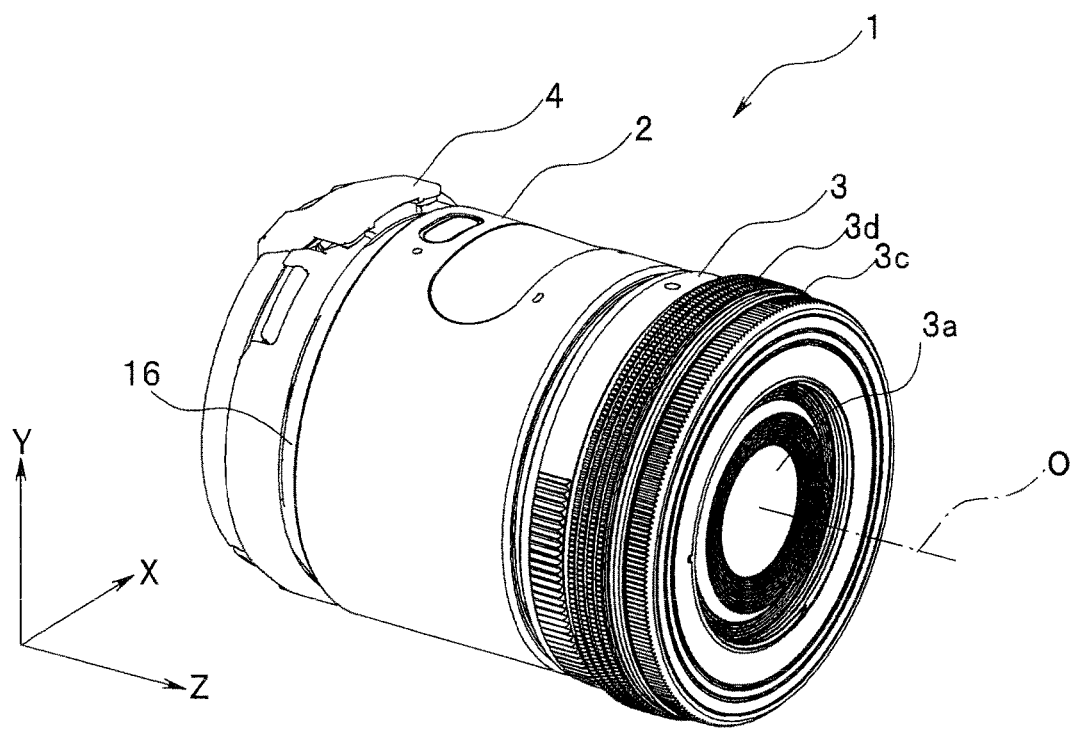
FIG. 1 is an external perspective view illustrating an entire image pickup system including an image pickup apparatus according to a first embodiment of the present invention.

Embodiments of the present invention will be described below with reference to the drawings. The respective drawings used in the below description are schematic ones, and in order to indicate respective components in a recognizable manner in the drawings, e.g., dimensional relationships among the respective components and/or scales of the respective components may differ from one another. Therefore, the present invention is not limited only to the forms illustrated in the drawings in terms of the counts and amounts, and the shapes of the components illustrated in the respective drawings, and the size ratios and the relative positional relationships among the components illustrated in the drawings.

Note that in the below description, a Z-axis refers to a direction along an optical axis of an image pickup optical system in a replaceable lens barrel. A Y-axis refers to a direction orthogonal to the Z-axis, which is an upper/lower direction of an image pickup apparatus. Likewise, an X-axis refers to a right/left direction of the image pickup apparatus (see FIGS. 1 to 3).

In this case, the upper/lower direction of the image pickup apparatus refers to a direction along a short side of an image pickup surface (light receiving surface) of an image pickup device disposed inside the image pickup apparatus, and in this case, a side of the image pickup apparatus on which a release operation member is arranged refers to "upper side". Also, the right/left direction of the image pickup apparatus refers to a direction along a long side of the image pickup surface (light receiving surface) of the image pickup device disposed inside the image pickup apparatus, and in this case, the left side as viewed from the front side (object side) of the image pickup apparatus is referred to as "left side", and the right side is referred to as "right side".

First Embodiment

Figure 2:
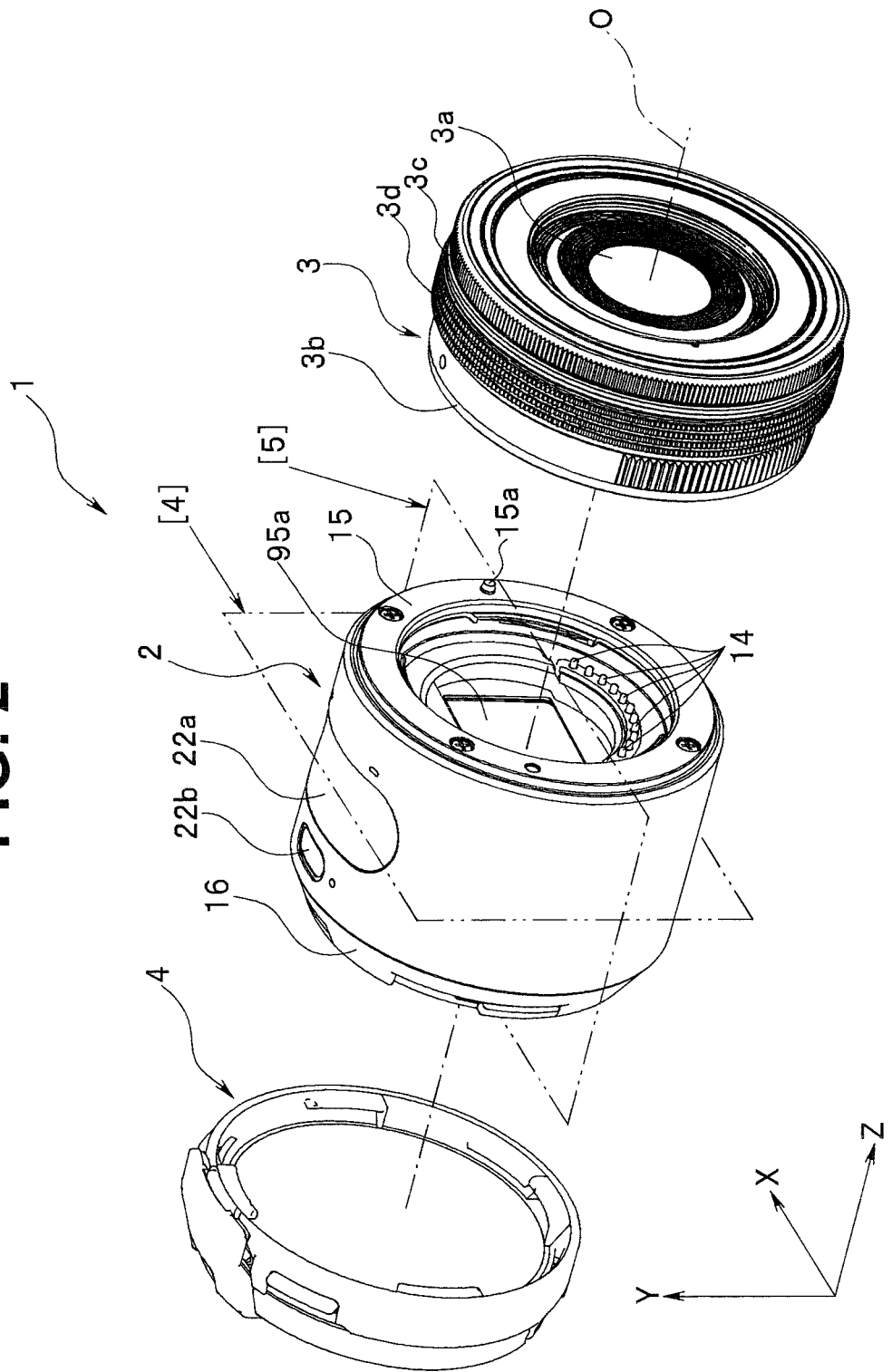
FIG. 2 is an exploded perspective view illustrating a state in which components of the image pickup system in FIG. 1 are separated from one another.

FIGS. 1 and 2 are diagrams each illustrating an entire image pickup system including an image pickup apparatus according to a first embodiment of the present invention. In these figures, FIG. 1 is an exterior perspective view of a state in which respective components of an image pickup system are joined to one another. FIG. 2 is an exploded perspective view illustrating a state in which the respective components of the image pickup system are separated from one another. Here, FIGS. 1 and 2 indicate a form of an image pickup system including the image pickup apparatus according to the first embodiment of the present invention.

Figure 3:
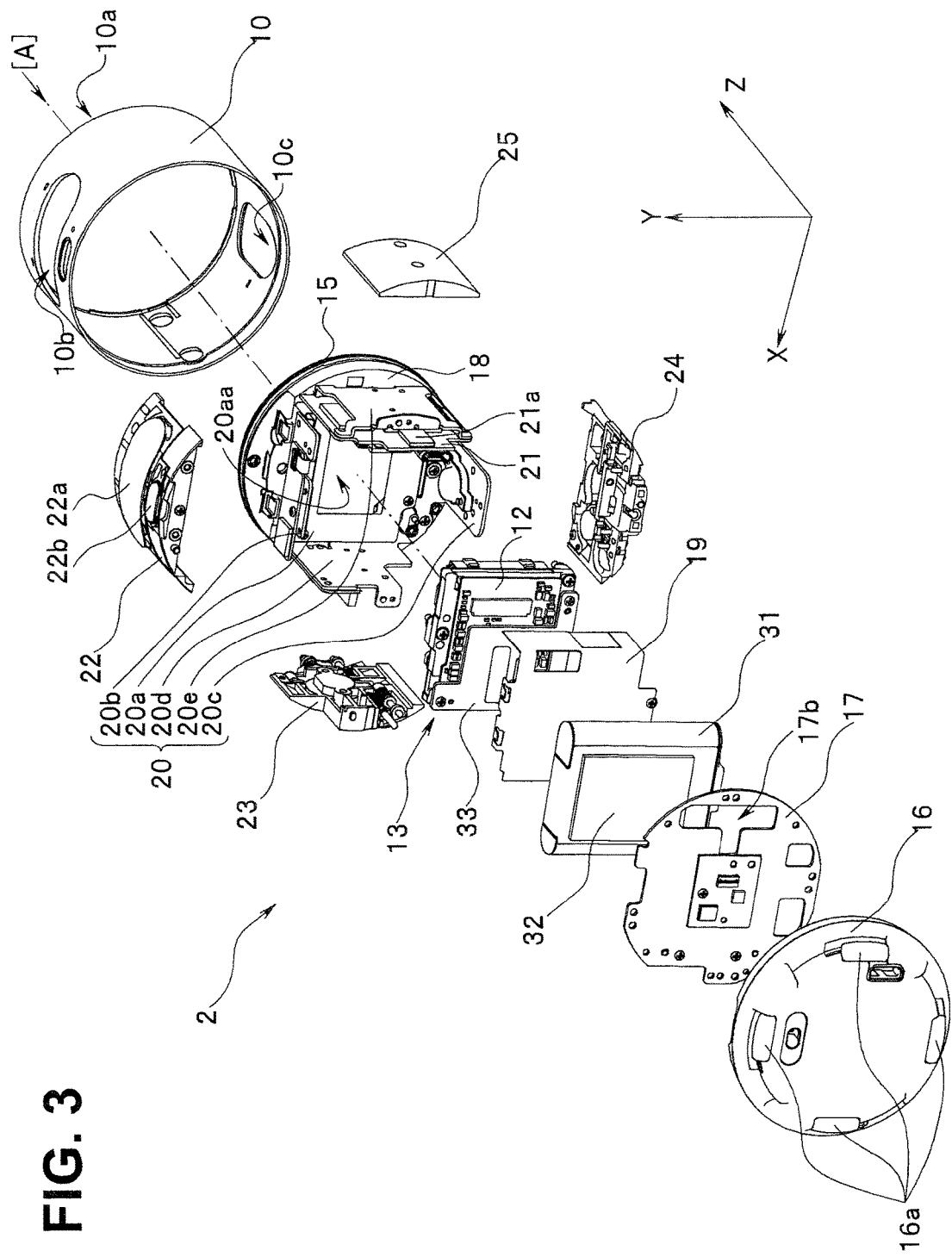
FIG. 3 is an exploded perspective view of the image pickup apparatus according to the first embodiment of the present invention.
Figure 4:
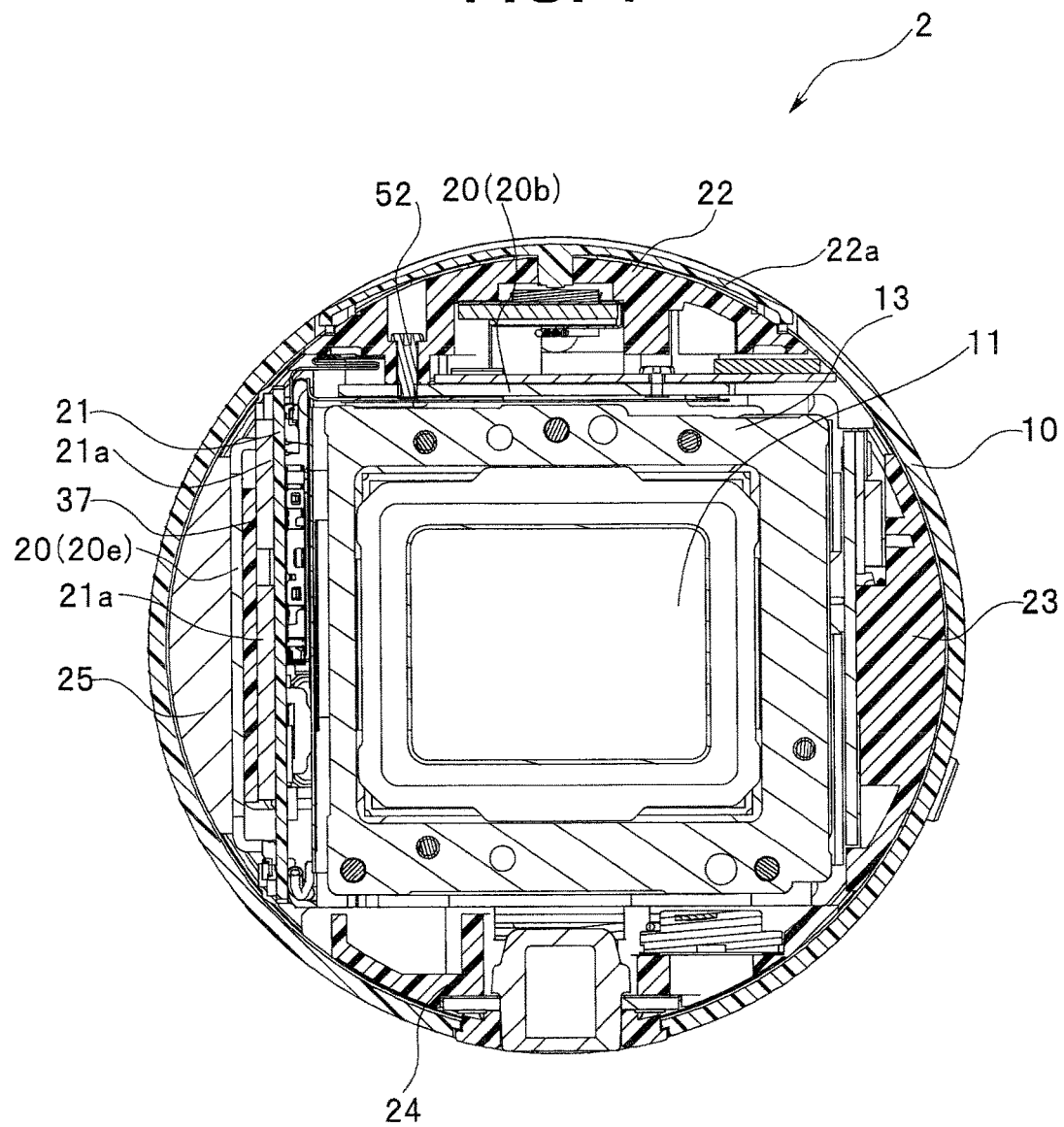
FIG. 4 is a vertical cross-sectional view along the plane (X-Y plane) indicated by reference numeral [4] in FIG. 2, as viewed from the front face side (object side)
Figure 5:
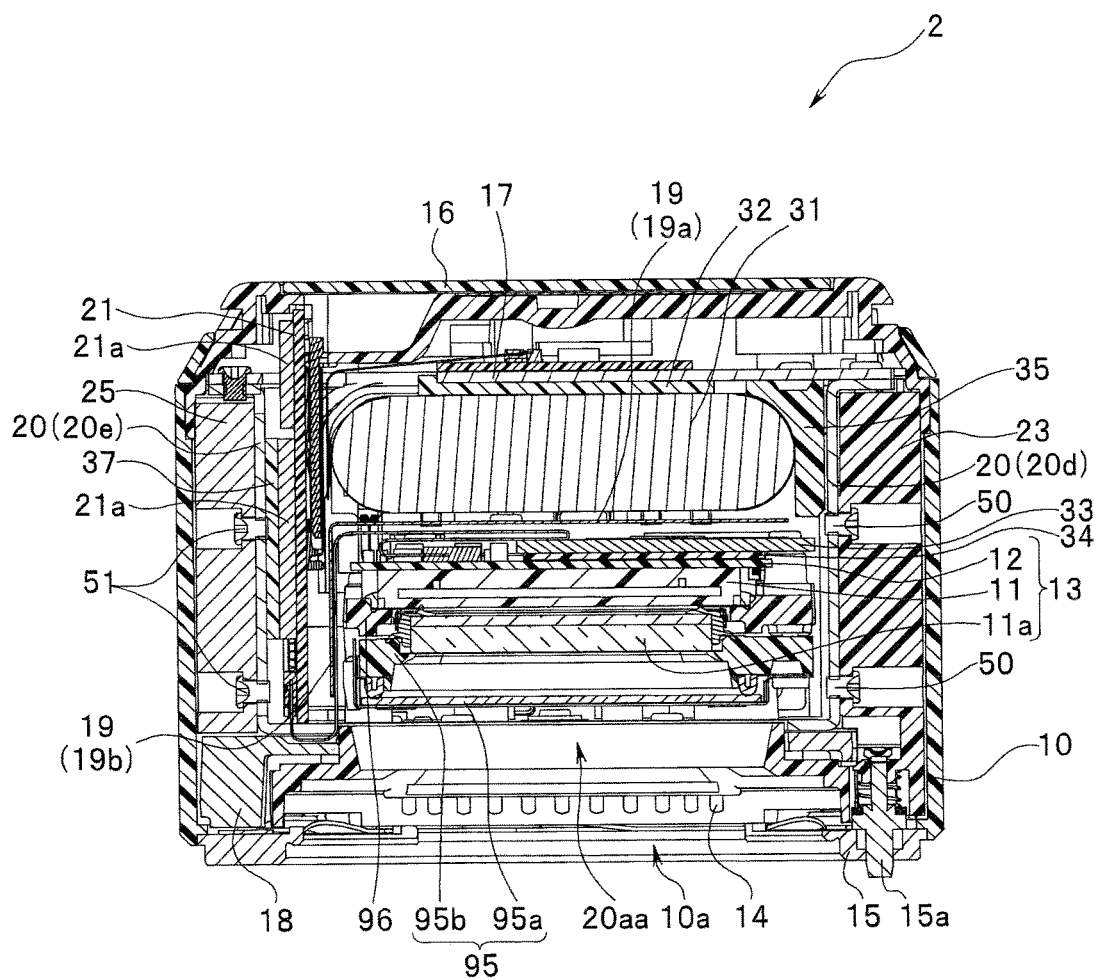
FIG. 5 is a horizontal cross-sectional view along the plane (X-Z plane) indicated by reference numeral [5] in FIG. 2, as viewed from the upper face side.

FIG. 3 is an exploded perspective view of the image pickup apparatus according to the first embodiment of the present invention. FIGS. 4 and 5 are cross-sectional views of the image pickup apparatus according to the present embodiment. In these figures, FIG. 4 is a vertical cross-sectional view along the plane (X-Y plane) indicated by reference numeral [4] in FIG. 2, as viewed from the front side (object side). FIG. 5 is a horizontal view along the plane (X-Z plane) indicated by reference numeral [5] in FIG. 2, as viewed from the upper side.

[Schematic Configuration of Entire Image Pickup System]

First, an overview of a schematic configuration of the image pickup system including the image pickup apparatus according to the first embodiment of the present invention will be described mainly with reference to FIGS. 1 and 2.

As illustrated in FIGS. 1 and 2, an image pickup system 1 mainly includes, e.g., an image pickup apparatus 2 according to the present embodiment, a replaceable lens barrel 3 and a device attachment adapter 4.

The image pickup apparatus 2 according to the present embodiment is an electronic device configured so as to have functions that are substantially equivalent to those of image pickup apparatuses in conventional digital cameras and the like. Therefore, the image pickup apparatus 2 includes, inside, e.g., an image pickup unit 13 (see FIG. 3) including, e.g., an image pickup substrate 12 (see FIG. 3) with, e.g., an image pickup device 11 (see FIGS. 4 and 5) and a drive circuit for driving the image pickup device 11 mounted thereon, a main substrate 21 (see FIG. 3) with, e.g., a plurality of electronic parts mounted thereon, the plurality of electronic parts providing, e.g., a control circuit, a plurality of electric substrates (not illustrated) such as an electric substrate to be connected to communication contact terminals 14, and a power supply unit including a power supply battery 31 (e.g., a rechargeable battery; see FIG. 3) (hereinafter simply abbreviated as "power supply battery 31"). Details of these internal components of the image pickup apparatus 2 will be described later.

At a front face of the image pickup apparatus 2, a mount ring 15 (see FIG. 2), which serves as a mount member for fitting of the replaceable lens barrel 3, is provided. In a mount surface of the mount ring 15, locking pins 15a (see FIG. 2) provided so as to be able to project/retract to/from the outside is provided. The locking pins 15a are members forming a part of a locking mechanism provided to, when the replaceable lens barrel 3 is fitted to the front face of the image pickup apparatus 2, restrict turning of the replaceable lens barrel 3 and thereby maintain the fitting. Note that as a form of the mount member, one in a general form to be employed for a general interchangeable lens image pickup apparatus, for example, what is called a bayonet mount member, is employed.

On the back side of the image pickup apparatus 2, a back housing 16 for attachment of the device attachment adapter 4 is disposed. A more specific configuration of the image pickup apparatus 2 will be described later (see FIGS. 3 to 5).

At an outer face of the image pickup apparatus 2, a plurality of operation members are disposed. For example, in the vicinity of an upper surface of the image pickup apparatus 2, e.g., a release operation member 22a and a power supply operation member 22b are disposed. Also, examples of the operation members other than these members include, e.g., respective lens/adapter unlocking members for detachment of the replaceable lens barrel 3 and the device attachment adapter 4, respectively (both are not illustrated).

The replaceable lens barrel 3 includes, e.g., an image pickup optical system 3a including a plurality of optical lenses, a plurality of lens holding members (not illustrated) that hold respective component lenses of the image pickup optical system 3a, and a drive mechanism (not illustrated) for moving the plurality of lens holding members in a direction along an optical axis O.

Also, at a back face of the replaceable lens barrel 3, a lens mount 3b (see FIG. 2) to be joined to the mount ring 15 of the image pickup apparatus 2 is provided. Consequently, the replaceable lens barrel 3 is configured to attachable/detachable to/from the front face of the image pickup apparatus 2.

On a peripheral face of the replaceable lens barrel 3, for example, operation members such as a focus ring 3c for performing focusing operation and a zoom ring 3d for performing magnification changing operation are disposed so as to be rotatable around the optical axis O.

For the replaceable lens barrel 3, any of various existing replaceable lens barrels that have widely been used for conventional interchangeable lens image pickup apparatuses (cameras) is employed. Therefore, a configuration of the replaceable lens barrel 3 itself is similar to those of conventional replaceable lens barrels, and thus description of the specific configuration of the replaceable lens barrel 3 and illustration of an internal mechanism of the replaceable lens barrel 3 are omitted. Here, the replaceable lens barrel 3 illustrated in FIGS. 1 and 2 is a mere example of a form of a conventional replaceable lens barrel.

The device attachment adapter 4 is a device connection component unit provided between the image pickup apparatus 2 and an external device (not illustrated) such as a mobile electronic device to join the image pickup apparatus and the external device in an integrated manner. For the external device (not illustrated) to be joined to the image pickup apparatus 2 via the device attachment adapter 4, for example, a generally-used mobile electronic device having a communication function and a control function and further including an image display apparatus that enables provision of an image display function is employed. Communication between the external device and the image pickup apparatus 2 is provided by a function of an application installed in the external device.

Examples of the external device include, e.g., a mobile electronic device including a casing of a size that allows a user to handle the mobile electronic device with one hand and having a rough plate shape as a whole. This type of mobile electronic device includes, inside, e.g., an image display unit (image display section) including a display panel of around 4 to 5.5 inches and having an image information display function, and a communication unit (communication section) that provides various forms of communication functions (wireless communication such as wireless LAN, Wi-Fi (Wireless Fidelity), Bluetooth, NFC (near field communication) and wired communication such as communication via USB cables) and also include, e.g., a signal processing circuit that performs signal processing of, e.g., image signals and communication signals and a control circuit (control section) that controls the respective component units.

A linkage between this form of mobile electronic device (not illustrated) and the image pickup apparatus 2 according to the present embodiment via wireless communication enables the mobile electronic device to function as a control device for controlling the image pickup apparatus 2 according to the present embodiment, provide an image replay display function that causes image data acquired by the image pickup apparatus 2 be transferred to the mobile electronic device and receives the image data and causes an image based on the received image data to be displayed on a display panel, and also function as an image display apparatus that provides live view display for, during image pickup operation, sequentially receiving image data acquired by the image pickup device 11 in the image pickup apparatus 2 and sequentially displaying the received image data continuously.

Here, it is assumed that as this type of mobile electronic device, more specifically, e.g., a highly functional mobile phone, which is what is called a smartphone or the like, is employed; however, any other type of electronic device having functions that are equivalent to those of highly functional mobile phones can be employed. In other words, in building the image pickup system, the user can select and use an existing mobile electronic device, that is, any of various types of mobile electronic device the user have already possessed and have been using. In other words, there may be various types of mobile electronic devices that can be employed in the present image pickup system. Here, the mobile electronic device includes parts that are not directly related to the present invention and thus, illustration of the parts and description of specific configurations of the parts will be omitted.

The image pickup system 1 configured as described above is assumed to be a configuration unit in which an image pickup main unit formed by attaching the replaceable lens barrel 3 to the image pickup apparatus 2 and an existing mobile electronic device (not illustrated) are integrally joined to each other via the device attachment adapter 4.

The image pickup system 1 is configured so as to perform wireless communication between the mobile electronic device (not illustrated) and the image pickup apparatus 2 and thereby control the image pickup main unit by means of the control circuit in the mobile electronic device, enabling various types of operations such as an image pickup operation to be executed remotely.

More specifically, for example, it is possible that: various types of control signals are transmitted from the mobile electronic device to control the image pickup apparatus 2; driving of the replaceable lens barrel 3 is controlled via the image pickup apparatus 2; and image data acquired by the image pickup apparatus 2 is transmitted to the mobile electronic device to display an image on the image display section of the mobile electronic device.

Furthermore, the above-described image pickup system 1 is configured so that the image pickup apparatus 2 and the mobile electronic device transmit/receive, e.g., control signals and image data by means of wireless communication, and thus, the image pickup system 1 can function even if the respective components units are not necessarily integrally, joined. In other words, even if the image pickup apparatus 2 (image pickup main unit) with the replaceable lens barrel 3 fitted thereto and the existing mobile electronic device are separated from each other, connection between the image pickup apparatus 2 and the mobile electronic device via wireless communication can be ensured. Therefore, even in such manner of usage, performing various controls and data transmission/reception between the image pickup apparatus 2 and the mobile electronic device are possible. In the case of such manner of usage, the device attachment adapter 4 is configured so as to be brought into a tucked-in state as a result of the device attachment adapter 4 being fitted to the back face side of the image pickup apparatus 2. Therefore, in this case, the device attachment adapter 4 is prevented from impairing operability.

[Configuration of Image Pickup Apparatus]

Next, a configuration of the image pickup apparatus 2 according to the present embodiment will be described below mainly with reference to FIGS. 3 to 5.

As illustrated in, e.g., FIG. 3, the image pickup apparatus 2 according to the present embodiment mainly includes, e.g., an exterior member (10, 16) having a rough cylindrical shape as a whole, various component members housed in the exterior member, that is, a plurality of frame members (17, 18, 19, 20), resin fixing members (22, 23, 24), a heat sink 25, various functional component units (e.g., 13, 31), a plurality of electric substrates (21), etc., with a plurality of electronic parts (21*a*) mounted, a mount ring 15 and the like, and various operation members (e.g., 22*a*, 22*b*) each including a part exposed on the outer face side of the exterior member.

Here, the exterior member (10, 16), the plurality of frame members (17, 18, 19, 20), the resin fixing members (22, 23, 24) and the heat sink 25 form a casing, which is a basic component portion of the image pickup apparatus 2 according to the present embodiment. The casing surrounds a shooting light flux and has a length in a direction of the shooting light flux, that is, an optical axis direction of a replaceable lens barrel.

The exterior member forms a part of the casing of the image pickup apparatus 2. The exterior member is also called an exterior member because a major part of the exterior member is exposed to the outside and forms an exterior part of the image pickup apparatus 2. The exterior member includes, for example, the cylindrical housing 10 and the back housing 16.

The cylindrical housing 10 is an exterior member that is formed so as to cover a major part of an outer face of the casing of the image pickup apparatus 2 and has a hollow cylindrical shape as a whole, that is, a cylindrical outer covering. The cylindrical housing 10 is a member formed by, for example, injection molding or metal molding of a synthetic resin material. Inside the cylindrical housing 10, e.g., the plurality of frame members and various functional component units are housed.

The cylindrical housing 10 has a cylindrical shape including a round opening in each of a front part and a rear part in a Z-axis direction (see FIG. 3) and includes, inside, a space in which various component members can be arranged. Here, the front-side opening in the cylindrical housing 10 is referred to as "front opening" and is indicated by reference numeral 10*a*. Also, in an outer peripheral face of the cylindrical housing 10, e.g., through-holes for exposing various operation members (e.g., the release operation member 22*a*, the power supply operation member 22*b*, and the lens unlocking lever and the adapter unlocking lever (either is not illustrated)) to the outside, a through-hole for exposing, e.g., a tripod socket hole (not illustrated), and through-holes for displaying LEDs for state indication, and a through-hole for a microphone are provided at respective predetermined regions. More specifically, for example, a through-hole 10*b* for exposing the release operation member 22*a* and a through-hole 10*c* for exposing the tripod socket hole are provided (see FIGS. 3 and 8).

As described above, the back housing 16 is a component member for attachment of the device attachment adapter 4. The back housing 16 is disposed so as to cover the back side of the cylindrical housing 10. Consequently, the back housing 16 acts as an exterior member that protects the back side of the image pickup apparatus 2. At an outer part on the back side of the back housing 16, a plurality of (in the present example, four) claw-like adapter fitting portions 16*a* for attachment of the device attachment adapter 4 are provided (see FIG. 2).

The plurality of frame members are provided inside the cylindrical housing 10 and form another part of the casing of the image pickup apparatus 2. The plurality of frame members include, e.g., a back frame 17, a front cylindrical frame 18, an L-shaped frame 19 and a main frame 20.

The front cylindrical frame 18 is a member mainly forming a basic structure portion on the front side of the inside of the cylindrical housing 10. The front cylindrical frame 18 includes an outer peripheral edge having a shape conforming to the rough cylindrical shape of the cylindrical housing 10 so that the front cylindrical frame 18 can be inserted and arranged inside the cylindrical housing 10, also includes an opening conforming to the front opening 10*a* of the cylindrical housing 10, and has a rough circular ring shape as a whole. The front cylindrical frame 18 is fixed and arranged in a frontmost region inside the cylindrical housing 10. In the front cylindrical frame 18, some of internal component parts of the image pickup apparatus 2 are attached at respective predetermined positions. For example, on a front face of the front cylindrical frame 18, the mount ring 15 is fixedly provided via, e.g., screws. The front cylindrical frame 18 is, for example, a die-cast part manufactured using a metal material.

The back frame 17 is a member mainly forming a basic structure portion on the back side of the cylindrical housing 10. The back frame 17 includes an outer peripheral edge having a rough disc shape conforming to the cylindrical shape of the cylindrical housing 10 so that the back frame 17 can be inserted and arranged inside the cylindrical housing 10. Therefore, the back frame 17 is fixed and arranged in a backmost region inside the cylindrical housing 10. Consequently, the back frame 17 is a member occluding the back side of the cylindrical housing 10. Various internal component parts, for example, wireless communication on/off switch for turning on/off a wireless communication function and electronic parts including, e.g., a sensor element, such as an acceleration sensor or an angular velocity sensor (gyro sensor), that detects an inclination of the image pickup apparatus 2 and provides a level function are attached to opposite surfaces of the back frame 17. Also, in the back frame 17, a plurality of hole portions each having a predetermined shape are formed in respective predetermined regions in order to expose some of component parts disposed inside to the outside. Examples of the plurality of hole portions in the back frame 17 include an opening window 17*b* (see FIG. 3) formed to expose a part of a recording medium storing section from among the plurality of electronic parts mounted on the main substrate 21 of the image pickup apparatus 2 to the outside. Here, the back frame 17 is formed using a plate-like member formed by, e.g., press working of, for example, a metal (for example, a stainless steel (SUS)), or a rigid resin plate-like member.

The main frame 20 is formed by bending working of, for example, a metal (for example, a stainless steel (SUS)) plate-like member. The main frame 20 is a component member forming a main portion of a basic configuration unit of the image pickup apparatus 2.

The main frame 20 is formed in parallel to an X-Y plane at a position close to the front, and includes, in a rough center, a front-face flat plate portion 20*a* facing the front opening 10*a* of the cylindrical housing 10 and including an opening 20*aa* conforming to the image pickup device 11, and a plurality of flat plate portions (an upper-face flat plate portion 20*b*, a bottom-face flat plate portion 20*c*, a right side-face flat plate portion 20*d* and a left side-face flat plate portion 20*e*) extending rearward (to the back side) from respective outer peripheral edge portions of four sides of the front-face flat plate portion 20*a* and being parallel to four planar faces, that is, an upper face, a bottom face, a right side face and a left side face, respectively. Here, the right side face refers to a side face on the right side as viewed toward a front face of the image pickup apparatus 2 (as viewed in the arrow [A] direction on the Z-axis in FIG. 3). Likewise, the left side face refers to a side face on the left side as viewed toward the front face of the image pickup apparatus 2. Furthermore, the main frame 20 is equipped with two communication substrates, and on one of the communication substrates, a Bluetooth circuit is formed and on the other of the communication substrates, a Wi-Fi circuit is formed.

With such configuration as above, the main frame 20 has a rough rectangular parallelepiped shape as a whole and opens from the front side to the back side. When the main frame 20 is disposed inside the cylindrical housing 10, the opening on the back side of the main frame 20 is occluded by the back frame 17. In the main frame 20 formed as described above, a first space portion formed in a rough rectangular parallelepiped shape as a result of the first space being surrounded by the respective flat plate portions (20a, 20b, 20c, 20d and 20e) and the back frame 17 serves as a space for passage of a shooting light flux. Inside the first space portion, critical component parts in the image pickup apparatus 2, for example, the power supply battery 31, the image pickup unit 13 and the main substrate 21, are disposed.

The L-shaped frame 19 is formed by bending working of, for example, a metal (for example, stainless steel (SUS)) plate-like member. As illustrated in FIG. 5, the L-shaped frame 19 includes a surface 19a arranged in parallel to the X-Y plane and another surface 19b arranged in parallel to a Y-Z plane. The surface 19a of the L-shaped frame 19 is arranged so as to be interposed between the power supply battery 31 and the image pickup unit 13. Also, the other surface 19b of the L-shaped frame 19 is arranged so as to be interposed between the image pickup unit 13 and the main substrate 21. With such configuration as above, the L-shaped frame 19 receives and diffuses heat from heat generating members such as the power supply battery 31, the image pickup unit 13 and the main substrate 21, and is arranged so as to be interposed between the respective heat generating members arranged adjacent to each other inside the main frame 20 and thus prevents heat generated from one heat generating member from being transmitted directly to the other heat generating members.

The resin fixing members form another part of the casing of the image pickup apparatus 2. The resin fixing members include, e.g., an upper cover 22, a right cover 23 and a lower cover 24.

As described above, in the image pickup apparatus 2, the cylindrical housing 10 has a rough cylindrical shape. On the other hand, the main frame 20 has a rough rectangular parallelepiped shape as a whole. Then, the main frame 20 is fixed and arranged in the rough center part of the inside of the cylindrical housing 10. In the case of such configuration as above, a predetermined form of a second space portion having a rough crescent shape or a rough circular arc shape in cross section is formed between each of outer faces of the respective flat plate portions (the upper-face flat plate portion 20b, the bottom-face flat plate portion 20c, the right side-face flat plate portion 20d and the left side-face flat plate portion 20e) of the main frame 20 and an inner face of the cylindrical housing 10. Presence of spaces in a form such as the second space portions inside the cylindrical housing 10 may cause an outer covering part of the cylindrical housing 10 to easily suffer plastic deformation upon, e.g., an impact being imposed to an outer surface of the cylindrical housing 10.

Therefore, in the image pickup apparatus 2 according to the present embodiment, the upper cover 22, which is a resin fixing member, is disposed in the space portion between the inner face of the cylindrical housing 10 and the outer face of the upper-face flat plate portion 20b of the main frame 20. The upper cover 22 includes a circular arc-shaped surface formed so as to conform to a shape of the space portion and extend along an inner wall face of the cylindrical housing 10. Therefore, arrangement of the upper cover 22 so as to fill the space portion prevents plastic deformation of an upper portion of the cylindrical housing 10. Also, the upper cover 22 functions as a fixing member that allows, for example, operation members such as the release operation member 22a and the power supply operation member 22b from among the internal component members to be disposed in such a manner that the operation members can be actuated. Therefore, the upper cover 22 serves as a reinforcing member that prevents, e.g., deformation and/or breakage of an upper part of the cylindrical housing 10 and also functions as an operation section.

In a manner that is entirely similar to the above, in a bottom region of the inside of the cylindrical housing 10, the lower cover 24 is disposed in the space portion on the outer face of the bottom-face flat plate portion 20c of the main frame 20. In the lower cover 24 and the bottom-face flat plate portion 20c, a tripod attachment component unit (not illustrated) for disposition of a tripod socket hole is disposed. Therefore, the lower cover 24 acts to reinforce an outer covering on the bottom side and also functions as a reinforcing member for a tripod attachment region jointly with the bottom-face flat plate portion 20c.

Furthermore, likewise, in a right side face region of the inside of the cylindrical housing 10, the right cover 23 is provided in the space portion on the outer face of the right side-face flat plate portion 20d of the main frame 20. A locking mechanism including operation members such as a lens locking lever and an adapter locking lever, which are not illustrated, is attached to the right cover 23 in such a manner that the locking mechanism can be actuated. Therefore, the right cover 23 acts to reinforce the right side face of the outer covering of the cylindrical housing 10 and also has a function that fixedly holds the operation members and the mechanism portion.

Note that the respective covers (22, 23, 24) are each formed by, e.g., injection molding or metal molding of a synthetic resin material so as to include a rough circular arc-shaped surface extending along the inner wall face of the cylindrical housing 10, and for example, as illustrated in FIGS. 4 and 5, are fixed to predetermined regions of, e.g., the front cylindrical frame 18, the back frame 17 and the main frame 20 via screws 50, 51 and 52.

Also, in a left side face region of the inside of the cylindrical housing 10, a heat sink 25 is disposed as a left cover in the second space portion on the outer face of the left side-face flat plate portion 20e of the main frame 20, the heat sink 25 being formed of a metal member (by means of, for example, aluminum die casting) so as to have a shape that is substantially similar to those of the resin fixing members (22, 23, 24). The heat sink 25 is a heat dissipation member provided to diffuse heat generated inside the image pickup apparatus 2 to the outside. Therefore, the heat sink 25 includes a highly heat conductive metal mass such as an aluminum alloy, and in the case of the present embodiment, the metal mass has, for example, a shape including a rectangular flat surface that is parallel to the optical axis O and an circular arc curved surface connecting two sides of the rectangular shape that are parallel to the optical axis, the shape extending in the optical axis direction, and where a cross-section of the shape is taken along a flat face orthogonal to the optical axis, the cross-section is surrounded by an circular arc with the optical axis as a center and a straight line connecting opposite ends of the circular arc. That shape enables heat generated from electronic elements to be absorbed and released to the outside.

In a state in which the heat sink 25 is in abutment with the left side-face flat plate portion 20e of the main frame 20, the heat sink 25 is fixed to a predetermined region of the left side-face flat plate portion 20e via the screws 51 (see FIG. 5). Consequently, the heat sink 25, which is the left cover, acts as a reinforcing member to reinforce a left side face of the outer covering of the cylindrical housing 10 and also has a function that diffuses heat transmitted from internal structural objects via the left side-face flat plate portion 20e of the main frame 20.

Examples of various functional component units (internal component units) disposed inside the cylindrical housing 10 include, e.g., the image pickup unit 13 including the image pickup device 11, the power supply unit including the power supply battery 31 and the main substrate 21 with the electronic parts 21a mounted thereon, the electronic parts 21a being a plurality of electronic elements providing, e.g., the control circuit that performs overall control of the entire image pickup apparatus 2.

The image pickup unit 13 is fixedly arranged inside the main frame 20 in such a manner that an image pickup surface of the image pickup device 11 and the Z-axis are substantially orthogonal to each other and the image pickup surface of the image pickup device 11 is substantially parallel to the front opening 10a of the cylindrical housing 10. The image pickup unit 13 includes, e.g., the image pickup device 11, an optical filter 11a and the image pickup substrate 12.

The image pickup device 11 is an electronic part that performs photoelectric conversion of an optical image formed on a light receiving surface by the image pickup optical system 3a in the replaceable lens barrel 3. In other words, the image pickup device 11 is an electronic element that is provided in the casing, and receives a shooting light flux at a terminal end of the shooting light flux and picks up an image.

For the image pickup device 11, for example, one that is equivalent to those conventionally employed in general image pickup apparatuses and the like such as a CCD (charge coupled device) image sensor using a semiconductor element of a CCD or an MOS image sensor, which is a solid-state image pickup device using CMOS (complementary metal oxide semiconductor), is used.

The image pickup substrate 12 is an electric substrate with the image pickup device 11 and a plurality of electronic parts forming, e.g., the drive circuit for driving the image pickup device 11. The light receiving surface of the image pickup device 11 is arranged so as to face the front side, that is, the front opening 10a of the cylindrical housing 10 and the opening 20aa of the front-face flat plate portion 20a, and disposed so as to be parallel to a plane that is substantially orthogonal to the optical axis O (see, e.g., FIG. 1, the Z-axis) of the replaceable lens barrel 3 attached to the front face of the image pickup apparatus 2 (that is, the X-Y plane). Therefore, the image pickup substrate 12 is disposed inside the main frame 20 so as also to be parallel to the light receiving surface of the image pickup device 11. Then, the image pickup unit 13 is fixedly held to the front cylindrical frame 18 via an image pickup device holding member 96.

The optical filter 11a includes a plurality of optical filters provided to remove predetermined frequency components from an incoming optical flux entering toward the image pickup surface of the image pickup apparatus 2. For the optical filter 11a, specifically, for example, an infrared (IR) cutoff filter that cuts off, e.g., infrared components or a low-pass filter that reduces high-frequency components is employed. The optical filter 11a includes a substantially-transparent thin-plate-like member including a highly-light transmissive material. The optical filter 11a is disposed on a front face of the image pickup device 11 of the image pickup unit 13.

On the front side of the image pickup unit 13, a dust removing unit 95 (see FIG. 5) is disposed integrally with the image pickup unit 13. The dust removing unit 95 includes, e.g., a protection glass 95a, a holding member 95b and a vibration driving mechanism (not illustrated). Among these components, the protection glass 95a is a transparent thin-plate-like member provided for protection of the light receiving surface of the image pickup device 11. The protection glass 95a is provided in a region behind the opening 20aa of the front-face flat plate portion 20a of the main frame 20 on the front side of the light receiving surface of the image pickup device 11. The protection glass 95a is arranged in parallel to the light receiving surface of the image pickup device 11. The protection glass 95a acts to bring a space in a predetermined area on the front side of the image pickup device 11 into a hermetically-closed state. Consequently, the protection glass 95a prevents entry of dust and the like to the inside from the opening 20aa, and thereby prevents the dust and the like from adhering to the light receiving surface of the image pickup device 11. The protection glass 95a is configured to vibrate when the protection glass 95a is subjected to vibration driving by the vibration driving mechanism (not illustrated) including, for example, a piezoelectric element.

The holding member 95b is a fixing member that supports an outer edge portion of the protection glass 95a, and holds the protection glass 95a in parallel to the light receiving surface of the image pickup device 11 while allowing vibration caused by the vibration driving mechanism.

With such configuration as above, the dust removing unit 95 provides a dust removing mechanism that makes the protection glass 95a bring the predetermined space on the front side of the image pickup device 11 into a hermetically-sealed state and then makes the vibration driving mechanism vibrate the protection glass 95a via a vibration member such as a piezoelectric element to shake off and thereby remove dust and the like adhering to an outer surface of the protection glass 95a. Note that instead of the protection glass 95a, a filter member, which is conventionally provided on the light receiving surface of the image pickup device 11, for example, an infrared cutoff filter or a low-pass filter may be used.

The configuration of the dust removing unit 95 itself includes parts that are not directly related to the present invention, and thus, detailed description of the parts will be omitted assuming that one that is equivalent to those conventionally used in general cameras and the like is employed.

On the back side of the image pickup substrate 12 of the image pickup unit 13, a heat dissipation plate 33 is provided. The heat dissipation plate 33 includes, for example, a plate-like member of a metal such as aluminum, and is fixed to the image pickup device holding member 96 via, for example, screws (not illustrated).

The heat dissipation plate 33 is a member disposed for heat dissipation. Therefore, a heat dissipation sheet 34, which is a heat dissipation member including a material having a high heat conductivity and having, for example, a thin film sheet-like shape or a tape-like shape and is also a heat transmission sheet, is held between the heat dissipation plate 33 and the image pickup substrate 12. Consequently, heat generated from, e.g., the image pickup device 11 on the image pickup substrate 12 is transmitted to the heat dissipation plate 33 via the heat dissipation sheet 34 and is further released (dissipated) to the outside of the image pickup apparatus 2 from the respective metal members such as the main frame 20, the front cylindrical frame 18 and the mount ring 15 through the image pickup device holding member 96.

Furthermore, the power supply unit including the power supply battery 31 is disposed behind the heat dissipation plate 33. For the power supply battery 31, a rechargeable battery having a flat shape, for example, a general form of secondary battery such as a rechargeable battery that is, e.g., a lithium-ion secondary battery is employed.

In the inner space of the main frame 20, the power supply battery 31 is disposed inside a battery holding chamber formed in a region on the back side of the image pickup unit 13 in such a manner that the power supply battery 31 is substantially parallel to the image pickup unit 13. Inside the battery holding chamber, a battery supporting member 35 having a shape conforming to an outer shape of the employed power supply battery 31 is provided. The battery supporting member 35 acts to hold the power supply battery 31 inside the battery holding chamber. The surface 19a (see FIG. 5) of the L-shaped frame 19 is arranged so as to be interposed between the power supply battery 31 and (the heat dissipation plate 33 of) the image pickup unit 13. This configuration allows heat generated from the image pickup unit 13 and the power supply battery 31 to be diffused to other regions via the L-shaped frame 19. Also, this configuration prevents direct transmission of heat generated from the image pickup unit 13 and heat generated from the power supply battery 31 to each other.

Also, on an inner face on the back side of the battery holding chamber, a heat dissipation sheet 32, which is a heat dissipation member as well as a heat transmission sheet, is disposed. Like the heat dissipation sheet 34, the heat dissipation sheet 32 is a heat dissipation member including a material having a high heat conductivity and having, for example, a thin film sheet-like shape or a tape-like shape. The heat dissipation sheet 32 is disposed so as to be held between a surface on the back side of the power supply battery 31 held inside the battery holding chamber and an inner face of the back frame 17. This configuration allows heat generated from the power supply battery 31 to be transmitted to the back frame 17 via the heat dissipation sheet 32, and further released (dissipated) to the outside of the image pickup apparatus 2 via the metal members such as the main frame 20, the front cylindrical frame 18 and the mount ring 15.

Also, as illustrated in FIGS. 3 to 5, on a left side face of the inner space of the main frame 20, the main substrate 21 is disposed so as to be parallel to an inner face of the left side-face flat plate portion 20e of the main frame 20. In other words, the main substrate 21 is an electric substrate having a plane that is provided in an area on the outer side relative to an area in which the image pickup surface is provided as the image pickup device 11 is viewed from the front and is arranged so as to be parallel to an optical axis O of a shooting light flux. The main substrate 21 is an electric substrate with the plurality of electronic parts 21a (electronic elements) mounted thereon, the plurality of electronic parts 21a including, e.g., a CPU (central processing unit) providing the control circuit for performing overall control of the image pickup apparatus 2.

As described above, a part of the main substrate 21 is disposed so as to be exposed to the rear along the optical axis direction from the opening window 17b (see FIG. 3) of the back frame 17 to the outside. Consequently, some of the electronic parts mounted on the main substrate 21, more specifically, e.g., a memory card slot and a connector for connection with an external device are exposed to the outside on the back side.

As illustrated in FIGS. 4 and 5, a heat dissipation sheet 37, which is a heat dissipation member as well as a heat transmission sheet, is disposed so as to be held between the electronic parts 21a (electronic elements) on the main substrate 21 and the inner face of the left side-face flat plate portion 20e. Like the heat dissipation sheets 32 and 34, the heat dissipation sheet 37 is a heat dissipation member including a material having a high heat conductivity and having, for example, a thin film sheet-like shape or a tape-like shape.

The heat dissipation sheet 37 is a heat transmission sheet disposed so as to cover outer faces of electronic parts, in particular, ICs (integrated circuits) providing the CPU providing the control circuit and the image processing engine, that is, electronic parts that generate a significant amount of heat during operation of electronic circuits from among the electronic parts 21a (electronic elements) disposed and arranged on the main substrate 21, the heat transmission sheet being placed on such electronic parts (electronic elements).

As described above, in the image pickup apparatus 2 according to the present embodiment, the heat sink 25 is disposed so as to fill the space portion between the outer face of the left side-face flat plate portion 20e of the main frame 20 and the inner face of the cylindrical housing 10. The heat sink 25 is fixed in abutment with the outer face of the left side-face flat plate portion 20e, via the screws 51 (see FIG. 5).

In other words, the heat dissipation sheet 37, which is a heat transmission sheet, is provided between the electronic parts 21a (electronic elements) on the main substrate 21 and the left side-face flat plate portion 20e of the main frame 20, and the heat sink 25 is disposed on the outer side of the left side-face flat plate portion 20e of the main frame 20. With such configuration, the heat sink 25 is placed on the heat dissipation sheet 37 (via the left side-face flat plate portion 20e of the main frame 20) in such a manner that the heat dissipation sheet 37 is held together with the electronic parts 21a (electronic elements) between the main substrate 21 and the heat sink 25.

Therefore, such configuration allows heat generated from the electronic parts 21a (electronic elements) on the main substrate 21 to be released (dissipated) to the outside of the image pickup apparatus 2 from the metal members such as the main frame 20, the heat sink 25, the front cylindrical frame 18 and the mount ring 15 through the heat dissipation sheet 37.

Also, inside the main frame 20, the other surface 19b (see FIG. 5) of the L-shaped frame 19 is arranged so as to be interposed between the main substrate 21 and the image pickup unit 13. This configuration causes heat generated from the image pickup unit 13 and the main substrate 21 to be diffused to other regions via the L-shaped frame 19. Also, direct transmission of the heat generated from the image pickup unit 13 and the heat generated from the main substrate 21 to each other is prevented.

As described above, on one side (front side) in the Z-axis direction (see FIG. 3) of the image pickup apparatus 2 according to the first embodiment, the front opening 10a is provided, and the other side (back side) is covered and occluded by the back housing 16. Also, the mount ring 15 is disposed at an outer edge portion of the front opening 10a and the replaceable lens barrel 3 is then detachably disposed.

In this case, heat generated from heat generating members that are heat generation sources housed inside the image pickup apparatus 2, in particular, e.g., the image pickup unit 13 including the image pickup device 11, the power supply unit including the power supply battery 31 and the main substrate 21 with electronic parts 21a mounted, the electronic parts 21a each generating a significant amount of heat, is diffused using, e.g., the metal members such as the main frame 20, the L-shaped frame 19 and the heat sink 25 and the heat dissipation sheet 37, enabling the heat to be released (dissipated) to the outside of the image pickup apparatus 2. Consequently, dark current generated by thermal noise can be reduced, enabling reduction of contamination of image data by, e.g., noise due to the dark current. Accordingly, deterioration in image quality of an image represented by acquired image data can be prevented.

Second Embodiment

Figure 6:
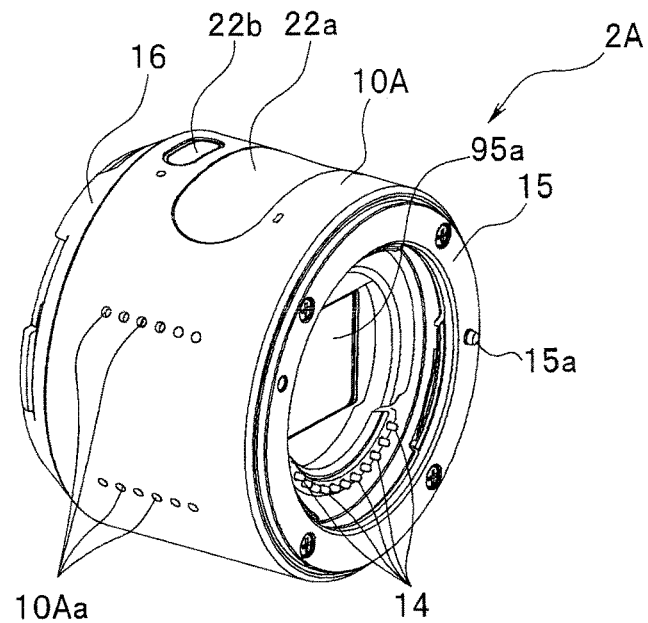
FIG. 6 is an exterior perspective view illustrating an image pickup apparatus according to a second embodiment of the present invention.
Figure 7:
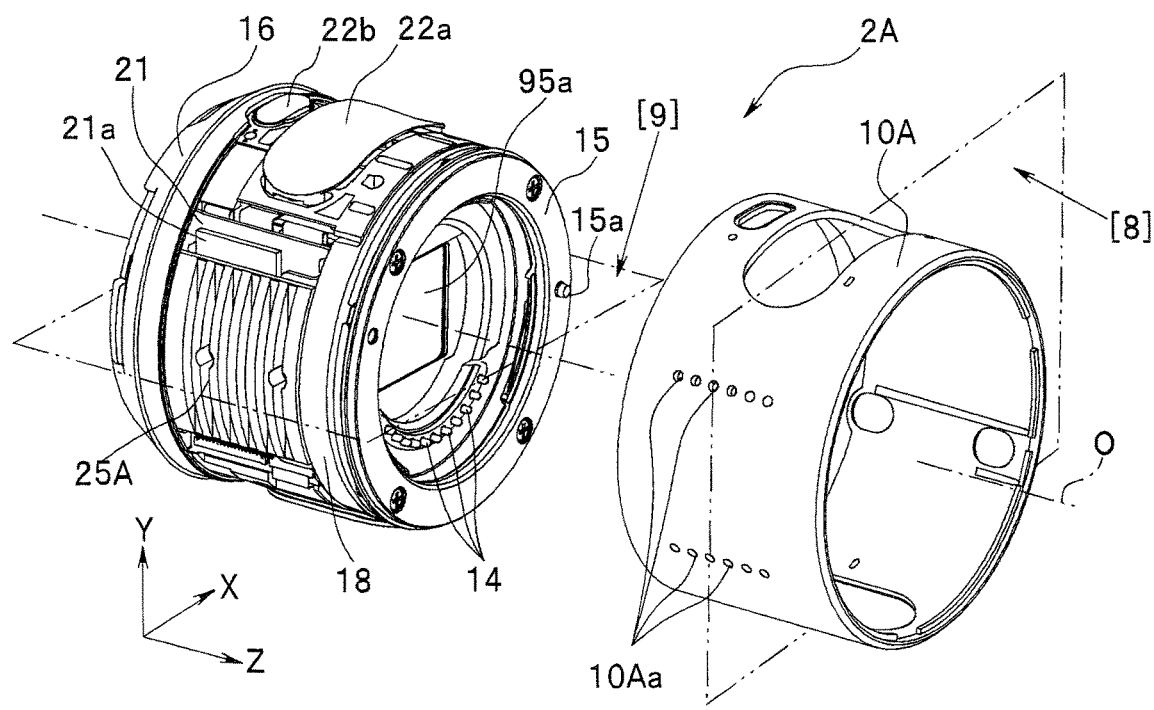
FIG. 7 is an exploded perspective view illustrating the image pickup apparatus in FIG. 6 with a cylindrical housing removed therefrom.
Figure 8:
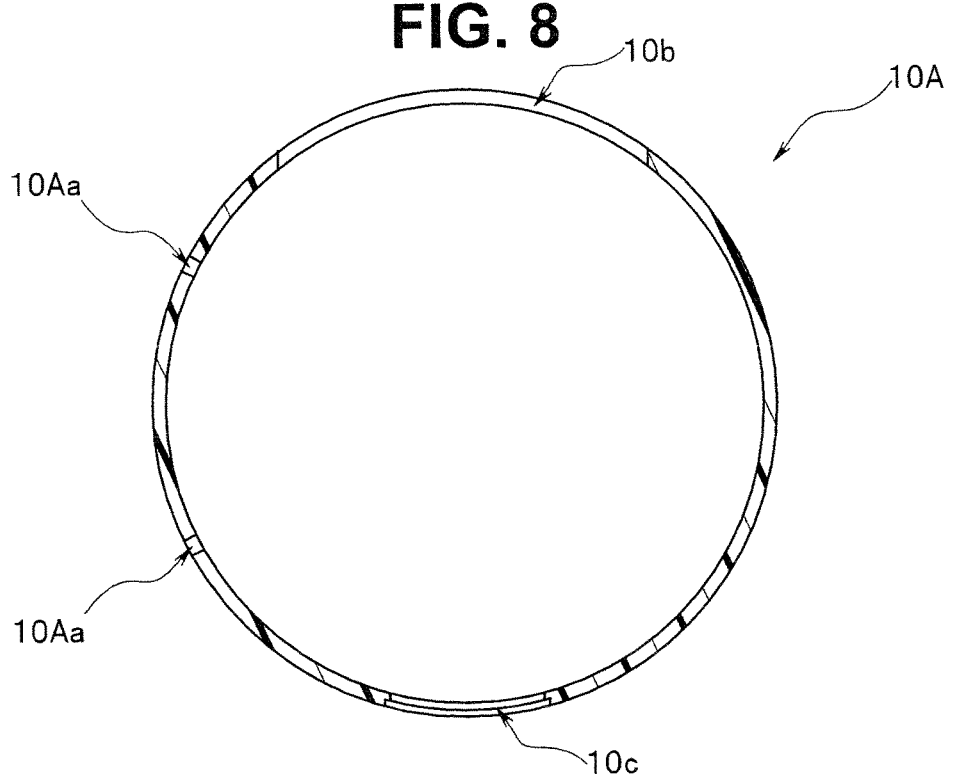
FIG. 8 is a vertical cross-sectional view along the plane (X-Y plane) indicated by reference numeral [8] in FIG. 7, as viewed from the front side (object side)
Figure 9:
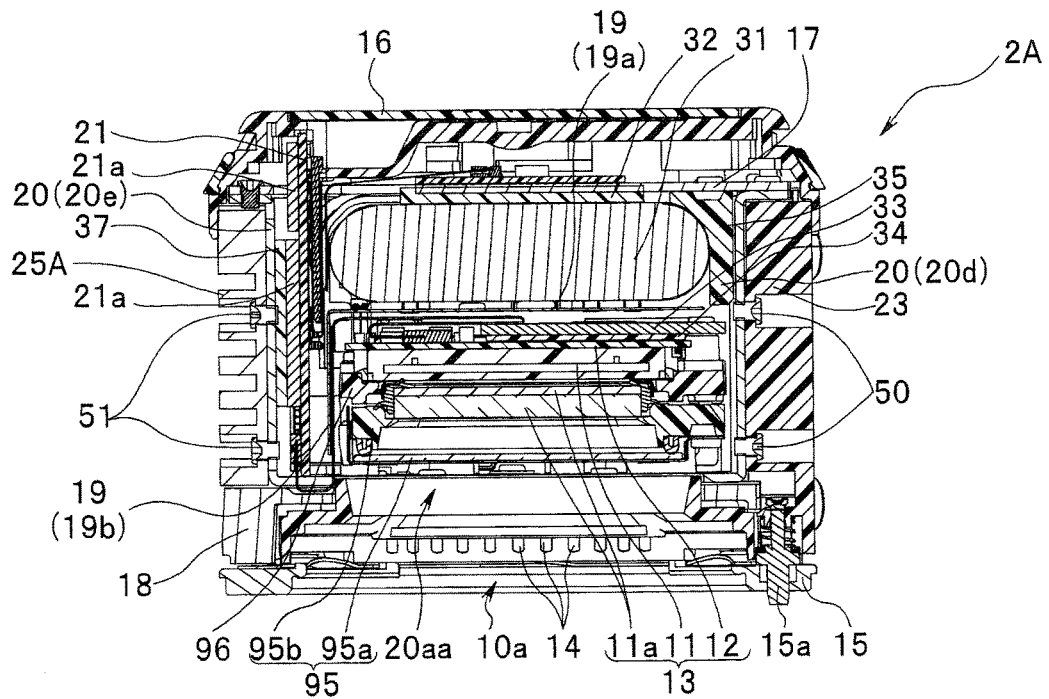
FIG. 9 is a horizontal cross-sectional view along the plane (X-Z plane) indicated by reference numeral [9] in FIG. 7, as viewed from the upper side.

Next, an image pickup apparatus according to a second embodiment of the present invention will be described below. FIGS. 6 to 9 are diagrams each illustrating the second embodiment of the present invention. Among the figures, FIG. 6 is an exterior perspective view illustrating an image pickup apparatus according to the present embodiment. FIG. 7 is an exploded perspective view illustrating the image pickup apparatus according to the present embodiment with a cylindrical housing removed therefrom. FIG. 8 is a vertical cross-sectional view of the cylindrical housing in the image pickup apparatus according to the present embodiment. FIG. 8 is a vertical cross-sectional view along the plane (X-Y plane) indicated by reference numeral [8] in FIG. 7, as viewed from the front side (object side). FIG. 9 is a cross-sectional view of the image pickup apparatus according to the present embodiment with the cylindrical housing removed therefrom. FIG. 9 is a horizontal cross-sectional view along the plane (X-Z plane) indicated by reference numeral [9] in FIG. 7, as viewed from the upper side.

A configuration of an image pickup apparatus 2A according to the present embodiment is basically substantially similar to that of the image pickup apparatus 2 according to the first embodiment described above. The image pickup apparatus 2A according to the present embodiment is just slightly different from that of the first embodiment in terms of a structure for releasing heat generated from heat generating members inside the apparatus. Therefore, in the below description, only component parts that are different from those of the first embodiment will be detailed, and components that are similar to those of the first embodiment will be provided with reference numerals that are the same as those of the first embodiment and detailed description thereof will be omitted.

The image pickup apparatus 2A according to the present embodiment includes a cylindrical housing 10A as an exterior member. A configuration of the cylindrical housing 10A itself is substantially similar to that of the first embodiment described above. However, the cylindrical housing 10A (cylindrical outer covering) according to the present embodiment is different from that of the first embodiment in that a plurality of ventilation holes 10Aa are formed in an outer peripheral face of a left side part, that is a part in which a heat sink 25A is disposed. Note that the heat sink 25A according to the present embodiment is indicated as an example of a form of a structural object having what is called a heat dissipation fin structure in which, for example, a plurality of flat plate-like projections extending in a direction perpendicular to an optical axis O (that is, a radial direction of the image pickup apparatus 2A) are arranged at predetermined intervals in a direction along the optical axis O, whereby a large heat transfer surface area is ensured. This configuration ensures a large surface area compared to the form of the heat sink indicated as an example in the above-described first embodiment, that is, the metal mass form and can be expected to provide an enhanced heat dissipation effect.

The plurality of ventilation holes 10Aa are ventilation through holes formed so as to penetrate the cylindrical housing 10A in order to let in a gas from the outside to (the vicinity of the heat sink 25A of) the inside of the cylindrical housing 10A and let out the gas warmed by the heat sink 25A to the outside. The plurality of ventilation holes 10Aa are arranged in two rows in the outer peripheral face of the cylindrical housing 10A in the direction along the Z-axis (optical axis O), the two rows being provided at a predetermined interval in a circumferential direction of the outer peripheral face. Note that the form illustrated in FIGS. 6 and 7 is an example of an arrangement form of the plurality of ventilation holes 10Aa, and the present invention is not limited to this form and any of various forms can be employed. The rest of the configuration is entirely similar to that of the first embodiment.

As described above, the second embodiment enables provision of effects that are similar to those of the above-described first embodiment. Furthermore, according to the present embodiment, the plurality of ventilation holes 10Aa are further formed in a part of the outer peripheral face of the cylindrical housing 10A, which is a part of an exterior member as well as a cylindrical outer covering, that is, an area corresponding to a part in which the heat sink 25A is disposed inside. Therefore, this configuration easily lets a gas caught in the heat sink 25A out to the outside via the plurality of ventilation holes 10Aa, whereby heat generated by internal heat generating members can more efficiently be diffused to the outside. Also, for the heat sink, various forms other than the respective forms indicated in the first embodiment (reference numeral 25) and the second embodiment (reference numeral 25A) are possible. For example, the heat sink may be one that is formed of a heat conductive substance and includes a planar flat plate portion integrated with a plurality of column-like projections extending therefrom or one that includes a heat conductive substance and also includes a linear or string-like flexible substance.

Third Embodiment

Figure 10:
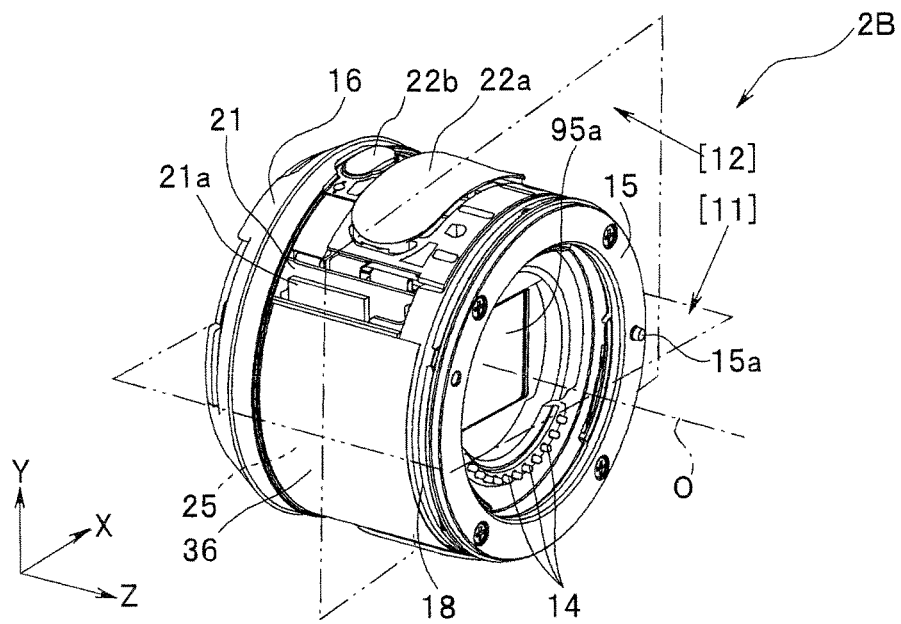
FIG. 10 is a perspective view illustrating an image pickup apparatus according to a third embodiment of the present invention, with a cylindrical housing removed.
Figure 11:
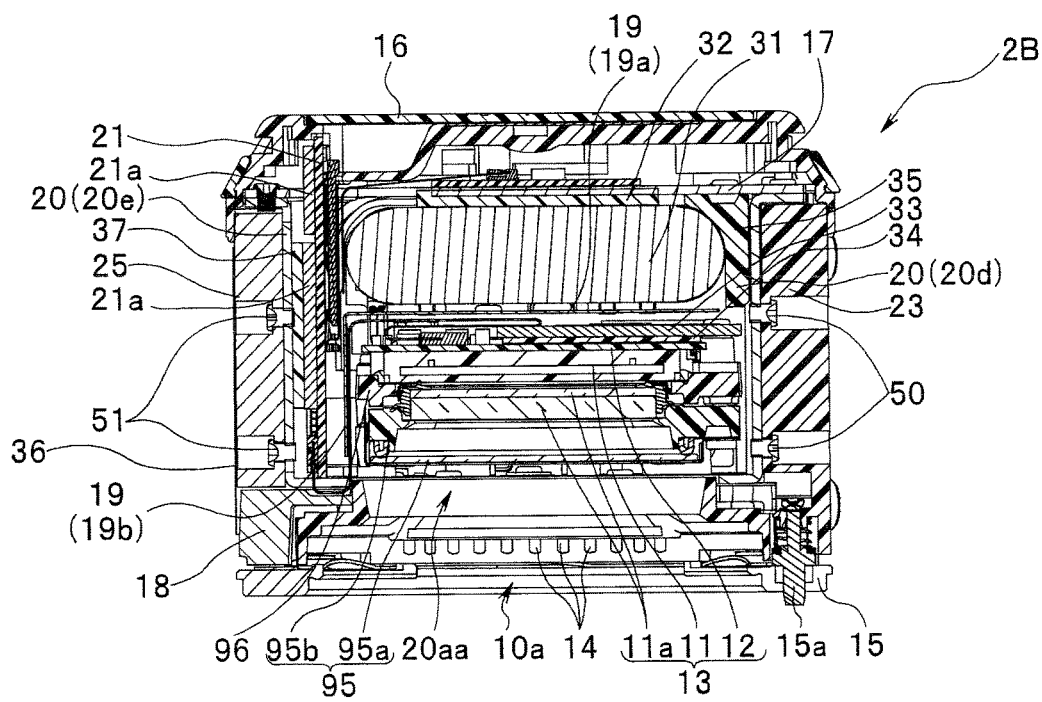
FIG. 11 is a horizontal cross-sectional view along the plane (X-Z plane) indicated by reference numeral [11] in FIG. 10, as viewed from the upper side.
Figure 12:
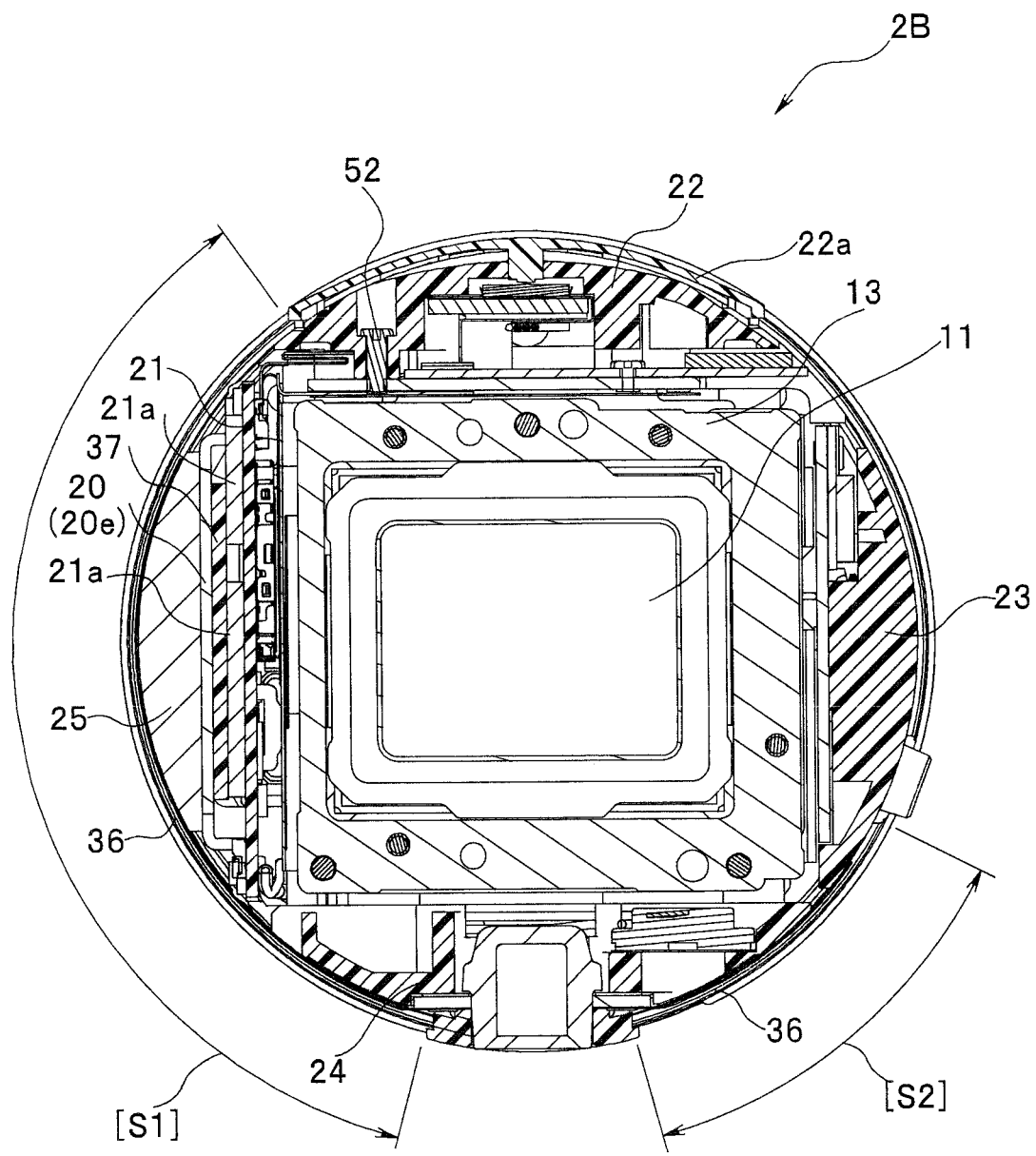
FIG. 12 is a vertical cross-sectional view along the plane (X-Y plane) indicated by reference numeral [12] in FIG. 10, as viewed from the front side (object side).

Next, an image pickup apparatus according to a third embodiment of the present invention will be described below. FIGS. 10 to 12 are diagrams each illustrating a third embodiment of the present invention. Among the figures, FIG. 10 is a perspective view illustrating an image pickup apparatus according to the present embodiment with a cylindrical housing removed. FIGS. 11 and 12 are cross-sectional views of the image pickup apparatus according to the present embodiment with the cylindrical housing removed. In these figures, FIG. 11 is a horizontal cross-sectional view along the plane (X-Z plane) indicated by reference numeral [11] in FIG. 10, as viewed from the upper side FIG. 12 is a vertical cross-sectional view along the plane (X-Y plane) indicated by reference numeral [12] in FIG. 10, as viewed from the front side (object side).

A configuration of an image pickup apparatus 2B according to the present embodiment is basically substantially similar to those of the image pickup apparatuses 2 and 2A according to the first and second embodiments described above. The image pickup apparatus 2B according to the present embodiment is just slightly different from those of the first and second embodiments in terms of a structure for releasing heat generated from heat generating members inside the apparatus. Therefore, in the below description, only component parts that are different from those of the first and second embodiments will be detailed, and components that are similar to those of the first and second embodiments described above will be provided with reference numerals that are the same as those of the first and second embodiments and detailed description thereof will be omitted.

In the image pickup apparatus 2B according to the present embodiment, for a cylindrical housing (not illustrated), which is an exterior member, one that is similar to those of the first and second embodiments is employed. A form of a cylindrical housing that can be employed in the present embodiment may be any of the forms mentioned above. Therefore, illustration and description of the cylindrical housing itself will be omitted. Also, in the image pickup apparatus 2B according to the present embodiment, various component objects inside the cylindrical housing are substantially similar to those of the first and second embodiments described above.

However, the image pickup apparatus 2B according to the present embodiment is different from those of the first and second embodiments in that as illustrated in FIGS. 10 to 12, a heat dissipation sheet 36, which is a second heat transmission sheet, is provided so as to cover an outer surface of a heat sink 25. Note that in the present embodiment, a form of the heat sink 25 that is similar to that of the first embodiment is indicated, but the form indicated as an example in the second embodiment (heat sink 25A) may be employed.

In other words, in the image pickup apparatus 2B according to the present embodiment, the heat dissipation sheet 36, which is a second heat transmission sheet, is arranged between an inner face of a cylindrical housing (not illustrated) and the outer surface of the heat sink 25. Here, the heat dissipation sheet 36, which is a second heat transmission sheet, is a heat dissipation member obtained as a result of a material that facilitates heat diffusion, for example, a copper foil sheet or a graphite sheet being formed into a thin sheet shape. The heat dissipation sheet 36 is bonded to, e.g., the inner face of the cylindrical housing or the outer surface of the heat sink 25 using, e.g., an adhesive.

In the present embodiment, the heat dissipation sheet 36 is disposed in the range indicated by reference numeral [S1] in FIG. 12 in a circumferential direction of the image pickup apparatus 2B so as to, for example, cover the entire outer surface of the heat sink 25 and further cover an outer surface of a lower cover 24 of the image pickup apparatus 2B continuously. In addition, in the image pickup apparatus 2B according to the present embodiment, the heat dissipation sheet 36 is also bonded and disposed between the inner face of the cylindrical housing (not illustrated) and outer surfaces of a right cover 23 and a lower cover 24 in the circumferential direction of the image pickup apparatus 2B in an area from an area of a bottom portion on the right side relative to a tripod socket hole 40 to a part of an area of the right side face, that is, within the range indicated by the reference numeral [S2] in FIG. 12. The heat dissipation sheet 36 and the outer surface of the heat sink 25 or the outer surfaces of the right cover 23 and the lower cover 24 are preferably in close contact with each other. Therefore, the heat dissipation sheet 36 is desirably bonded to the entire surface of each of the aforementioned members (25, 23, 24). The rest of the configuration is similar to those of the first and second embodiments.

Note that although in the present embodiment, illustration of the cylindrical housing is omitted, for a configuration of the cylindrical housing, either of the form indicated in the first embodiment and a form including ventilation holes such as indicated in second embodiment can be employed.

Also, the configuration of the present embodiment indicates an example in which the heat sink 25 is disposed as a left cover arranged on a left side face, the present invention is not limited to this example. For example, instead of the heat sink 25, a left cover including a material that is similar to that of the other resin fixing members may be provided. In this case, also, a heat dissipation sheet 36 is bonded to an outer surface of the left cover, also enabling diffusion of heat generated from internal structural objects.

As described above, the third embodiment enables provision of effects that are similar to those of the above-described first embodiment. Furthermore, according to the present embodiment, the heat dissipation sheet 36 is provided so as to cover the heat sink 25. Therefore, this configuration enables heat transmitted to the heat sink 25 to be easily diffused via the heat dissipation sheet 36.

It should be understood that the present invention is not limited to the above-described embodiments and various alterations and applications are possible without departing from the spirit of the invention. Furthermore, the above-described embodiments include various phases of the invention, and various aspects of the invention may be extracted by arbitrary combinations of the plurality of elements disclosed. For example, even where some elements are deleted from all the elements indicated in any of the above embodiments, a configuration with such elements deleted may be extracted as an aspect of the invention if such configuration can solve a problem to be solved by the invention and provide an effect of the invention. Furthermore, components of different embodiments may arbitrarily be combined. This invention is not restricted by any particular embodiments, but is limited by the attached claims.

What is claimed is:

1. An image pickup apparatus comprising:
a casing that includes an image pickup device, a front cylindrical frame, frame members, and a cylindrical housing surrounding the frame members, the frame members bing provided on the front cylindrical frame, having a length in a direction of a shooting light flux, and surrounding the shooting light flux, the
image pickup device receiving the shooting light flux at a terminal end of the shooting light flux in the casing and picking up an image;
a mount ring to which a replaceable lens can be fitted and through which the shooting light flux passes, the mount ring being provided at a front side in an optical axis direction of the image pickup apparatus;
a planar electric substrate arranged in parallel to an optical axis of the shooting light flux, outside an image pickup surface of the image pickup device, and provided between one of the frame members and the cylindrical housing;
an electronic element mounted on the electric substrate, the electronic element generating heat along with operation of an electronic circuit;
a heat transmission sheet placed on the electronic element; and a heat sink provided between the one of the frame members and the cylindrical housing and placed on the heat transmission sheet so that the heat transmission sheet is held together with the electronic element between the electric substrate and the heat sink, an outer peripheral face side of the heat sink being formed along an inner peripheral face of the cylindrical housing to reinforce the cylindrical housing.

2. The image pickup apparatus according to claim 1, wherein the heat sink has a shape in which a plurality of plate-like portions extending in a direction perpendicular to the optical axis are arranged in a direction of the optical axis.

3. The image pickup apparatus according to claim 1, wherein:
   the image pickup apparatus is covered by a cylindrical outer covering having a cylindrical shape;
   in a center area inside the casing fixed inside the cylindrical outer covering, a rough rectangular parallelepiped first space portion for passage of the shooting light flux is provided; and
   a second space portion having a crescent shape in cross section is provided between an outer face of the casing and an inner face of the cylindrical outer covering, and the heat sink is arranged inside the second space portion.

4. The image pickup apparatus according to claim 3, wherein in an outer peripheral face of the cylindrical outer covering, a ventilation hole that lets in a gas from an outside to a vicinity of the heat sink inside the cylindrical outer covering and lets the gas warmed by the heat sink out to the outside.

5. The image pickup apparatus according to claim 4, wherein the ventilation hole is formed in the vicinity of the heat sink inside the cylindrical outer covering.

6. The image pickup apparatus according to claim 1, comprising an exterior member covering an outer periphery of the casing, wherein a heat transfer member is disposed between the exterior member and the heat sink.

7. The image pickup apparatus according to claim 1, wherein: the heat transmission sheet is placed so as to cover an outer face of the electronic element mounted on the electric substrate; and a plate-like frame member of a metal is further interposed between the heat transmission sheet and the heat sink.

8. The image pickup apparatus according to claim 1, wherein a second heat transmission sheet is further provided on an inner face of the cylindrical outer covering.

9. The image pickup apparatus according to claim 8, wherein the second heat transmission sheet is a copper foil or graphite sheet.

10. The image pickup apparatus according to claim 8, wherein the second heat transmission sheet is disposed between the inner face of the cylindrical outer covering and an outer face of the heat sink.

11. The image pickup apparatus according to claim 10, wherein the second heat transmission sheet is bonded to the outer face of the heat sink and diffuses heat.

12. The image pickup apparatus according to claim 1, comprising an exterior member covering an outer periphery of the casing, wherein a heat transfer member is disposed between the exterior member and the heat sink, and the heat transfer member is extended over a region of the heat sink.

13. The image pickup apparatus according to claim 1, wherein a second heat transmission sheet is further provided on an inner face of the cylindrical outer covering, and the second transmission sheet is extended over a region of the heat sink.

14. The image pickup apparatus according to claim 1, wherein the front cylindrical frame defines a central axis, wherein the heat transmission sheet is arranged radially outward of the planar electronic element provided on the planar electric substrate, wherein the heat sink is provided adjacent to and radially outward of the heat transmission sheet, and radially inward of the front cylindrical frame.

15. The image pickup apparatus according to claim 14 wherein heat is dissipated radially outward from the planar electric element via the heat transmission sheet and is then further dissipated radially outward from the heat transmission sheet via the heat sink.

16. The image pickup apparatus according to claim 14 further comprising at least one crescent-shaped fixing member, wherein the heat sink is crescent-shaped, and wherein the heat sink and the at least one crescent-shaped fixing member reduce deformation of the cylindrical frame.

17. The image pickup apparatus according to claim 1, wherein the heat sink has a shape in which a plurality of plate-like portions extending in a direction perpendicular to the optical axis are arranged in a direction of the optical axis, and the respective plate-like portions are formed along the inner peripheral face of the cylindrical housing.

18. The image pickup apparatus according to claim 1, wherein:
   the image pickup apparatus is covered by a cylindrical outer covering having a cylindrical shape;
   in a center area inside the casing fixed inside the cylindrical outer covering, a rough rectangular parallelepiped first space portion for passage of the shooting light flux is provided; and
   a second space portion having a crescent shape in cross section is provided between an outer face of the casing and an inner face of the cylindrical outer covering, and the heat sink is arranged inside the second space portion, and an outer peripheral surface of the heat sink is formed along the inner peripheral face of the cylindrical housing.

* * * * *